Dec. 28, 1926.

E. R. WALTHER

INSULATING BOTTLE

Filed August 11, 1924

1,612,556

Patented Dec. 28, 1926.

1,612,556

UNITED STATES PATENT OFFICE.

ERNST ROBERT WALTHER, OF WEIMAR, GERMANY.

INSULATING BOTTLE.

Application filed August 11, 1924, Serial No. 731,433, and in Germany June 19, 1924.

This invention relates to an insulating bottle in which a porcelain cup serves as closure for the bottle, the rim of said cup bearing upon a rubber packing of the bottle envelope.

The porcelain cup has a metal cap terminating at two opposite sides in a lever, said levers being designed to be connected with the envelope in order to press the cup tightly on the envelope.

The cork stopper is securely fixed in the bottle neck by means of a screw bolt bearing against the inner surface of the bottom of the porcelain cup.

An insulating bottle constructed according to this invention presents decisive advantages over the insulating bottles of known type.

As the porcelain cup rests upon a rubber ring an absolutely airtight closing of the bottle is ensured so that the temperature of the contents of the bottle is preserved.

As the cork is pressed into the bottle neck it is securely held in its position and cannot get loose.

The greatest advantage of the improved insulating bottle is hygienic as a porcelain cup can be much better cleaned than a metal vessel. Food and beverages served in a metal cup have always a metallic taste and this is avoided by the use of a porcelain cup.

Porcelain being a bad conductor of heat the cup or the protecting metal cap on the same does not get hot. The metal cap which protects the porcelain cup against damage has at two opposite sides lever systems which act like toggle levers and serve to pull the metal cap in downward direction whereby the porcelain cup is strongly pressed on the packing ring, an absolutely airtight closing of the insulating bottle being thus ensured.

An embodiment of the invention is shown by way of example on the accompanying drawing, in which.

Figure 1:
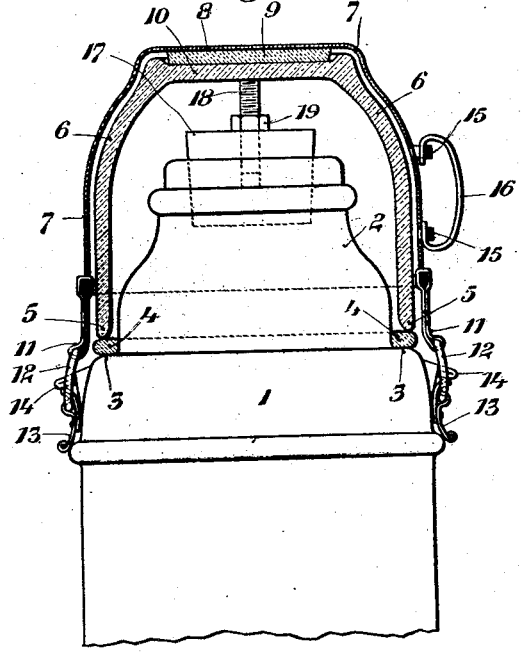
Fig. 1 shows in cross section the porcelain cup serving as closure for the bottle, the bottle being shown in elevation.
Figure 2:
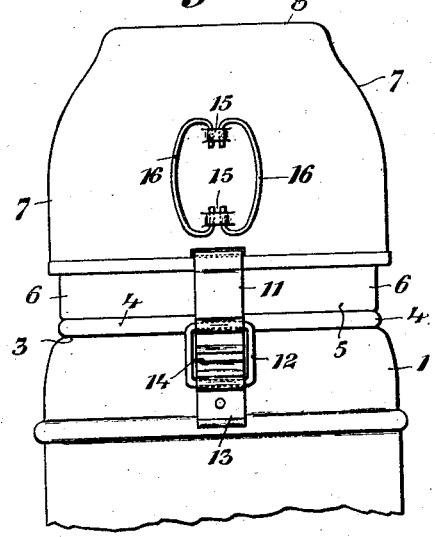
Fig. 2 is a side elevation seen at right angle to Fig. 1.

The envelope 1 of the insulating bottle 2 has a ring 4 of elastic material on its upper shoulder 3. The rim 5 of the porcelain cup 6, the shape of which corresponds to the shape of the insulating bottle 2 or of the envelope 1 of the same, rests upon said ring 4. The cup 6 is essentially cylindrical or oval so that, when the insulating bottle is of convenient shape, the cup should also serve as bowl or basin.

The elastic ring 4 serves as packing for the rim of the porcelain cup 6. The lining 9 on the inner surface of the bottom 8 of the metal cap 7, which covers the porcelain cup 6 completely or partly, is in contact with the outer surface of the bottom 10 of the porcelain cup 6. This metal cap 7 has at two opposite sides lugs 11 with locking levers 12 of convenient type. The hand lever 13 of each lever system is adapted to act like a toggle lever in connection with a convenient nose 14 of the envelope 1. When the toggle lever systems 11, 12, 13 are stretched the cup 6 is pressed on the elastic packing ring 4. The metal cap 7 has further handles 16 mounted in eyes 15 so that the handles can be turned towards and laid against the outer surface of the cup and do not project from the same. These handles 16 serve at the same time as handles for the porcelain cup. As the porcelain of the cup is a bad conductor of heat, the heat from the hot contents of the cup, when said cup is used for serving hot food, is not transmitted to the metal cap so that the handles remain cool.

A screw bolt 18 of convenient material, for instance wood, is screwed into the cork stopper 17 of the bottle, the length of the bolt which projects from the stopper being regulated by means of nut 19. This screw bolt 18 serves to securely hold the stopper in the bottle neck. The upper end of the screw bolt 18 presses against the inner surface of the bottom 10 of the porcelain cup 6. As the stopper 17 is thus tightly pressed into the neck of the bottle an airtight closing of the bottle is ensured.

I claim:—

An insulating bottle comprising in combination with the glass bottle metal envelope and stopper of said bottle, an adjustable screw bolt in said stopper, a cup-shaped closing cap designed to be placed upside down over said stopper, a metal envelope of said cup-shaped closing cap, a handle on said metal envelope of the cup, and means for securely connecting said metal envelope of the cup with said metal envelope of the bottle so that the rim of the cup-shaped closing cap is not in contact with said metal envelope of the bottle and the bottom of the cup-shaped closing cap pressing upon said adjustable screw bolt in the stopper securely holds said stopper in the bottle neck.

In testimony whereof I affix my signature.

ERNST ROBERT WALTHER.